Aug. 31, 1965
C. R. LYLES
3,203,243
PRESSURE RECORDING DEPTH GAUGE
Filed Aug. 9, 1961
2 Sheets-Sheet 1
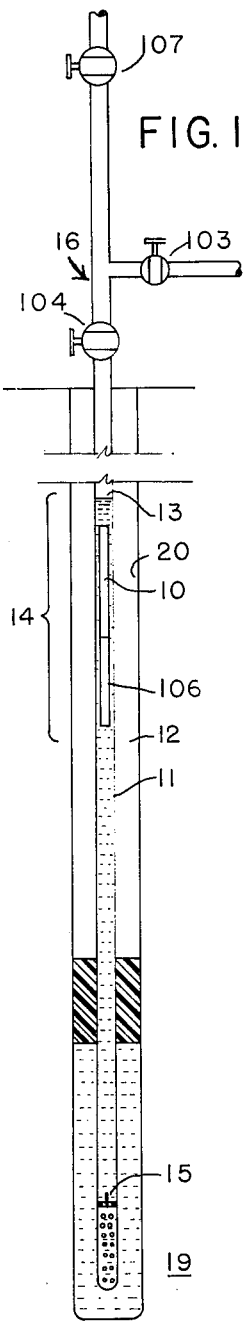
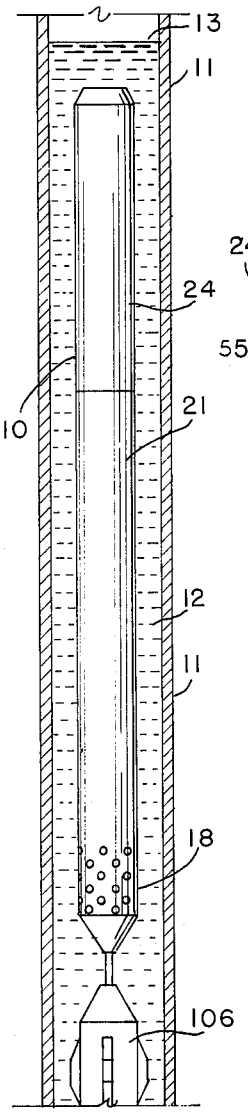
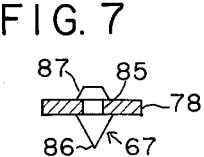
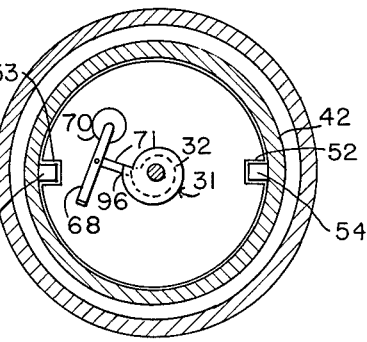
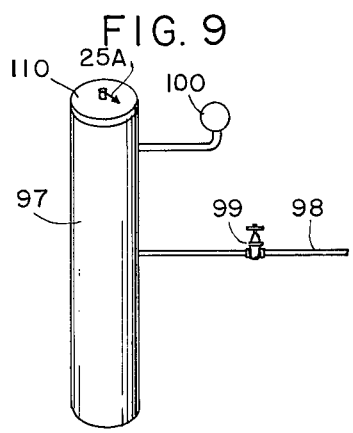
INVENTOR.
CECIL R. LYLES
BY
Ely Silverman
ATTORNEY Aug. 31, 1965   C. R. LYLES   3,203,243
PRESSURE RECORDING DEPTH GAUGE
Filed Aug. 9, 1961   2 Sheets-Sheet 2

INVENTOR.
CECIL R. LYLES
BY Ely Silverman
ATTORNEY

United States Patent Office 3,203,243
Patented Aug. 31, 1965

3,203,243
PRESSURE RECORDING DEPTH GAUGE
Cecil Ray Lyles, 2101 E. 16th St., Farmington, N. Mex.
Filed Aug. 9, 1961, Ser. No. 130,319
6 Claims. (Cl. 73—300)

Generally this invention relates to well measurement. More particularly, this invention is directed to a system and apparatus therefor for accurately, quickly, reliably and conveniently recording the sub-surface pressure and the level of liquid in an oil well.

One object of this invention is to provide an apparatus with which to accurately, reliably, quickly and conveniently measure the sub-surface pressure and the height of liquid in a well.

Another object of this invention is to provide a system whereby to accurately, reliably, rapidly and conveniently provide an accurate record of the sub-surface pressure and the height of liquids in a well hole.

It is a further object of this invention to provide an improved measuring apparatus for conveniently controlled motion down and up an oil well tubing.

Yet another object of this invention is to provide an improved well measuring and recording system and tools therefor.

Other objects of this invention will be apparent to those skilled in the art on study of the below disclosure of which the drawings attached thereto form a part. In the attached drawings, wherein like numerals denote like parts in the various figures.

FIGURE 1 is an overall diagrammatic view of an oil well showing the apparatus of this invention at an operative position therein;

FIGURE 2 is an overall view, partly broken away, of the well bore and of mechanism embodying the invention herein in said well bore, as shown in zone 14 of FIGURE 1;

Figure 3:
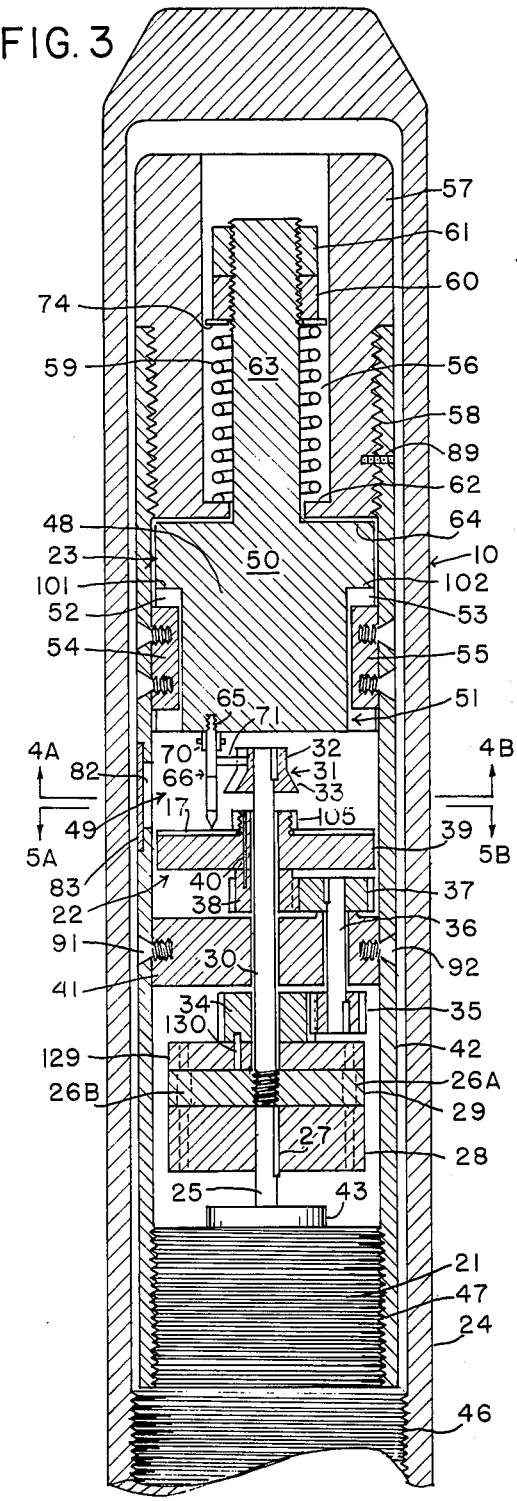
FIGURE 3 is an enlarged longitudinal substantially diametral sectional view of the upper portion of device 10 taken along the section indicated by plane 3A–3B of FIGURE 4.
Figure 4:
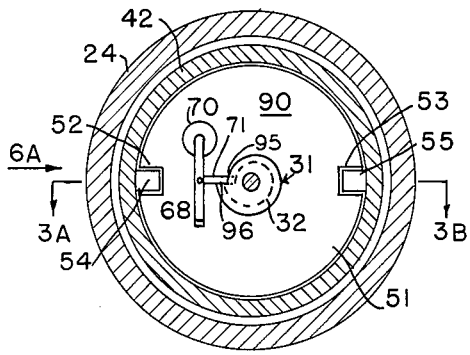
FIGURE 4 is a sectional view of the apparatus shown in FIGURE 3 along the section indicated by plane 4A–4B of FIGURE 3 when device 10 is at an upper portion of tube 11.
Figure 5:
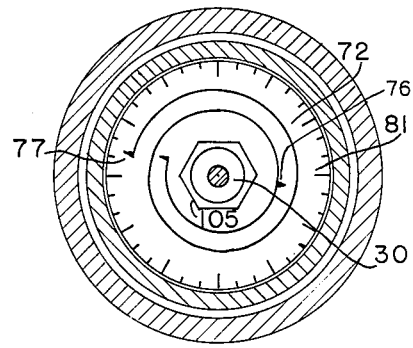
Figure 6:
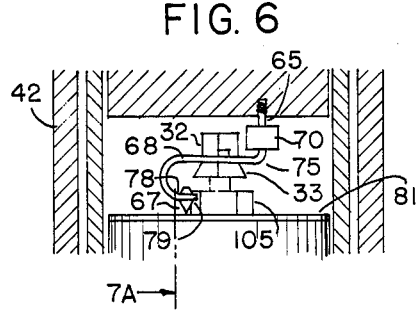

FIGURE 5 is a transverse cross-sectional view taken along the section indicated as plane 5A–5B of FIGURE 3 showing the trace 72 formed after passage of device 10 through liquid 12 and striking bottom stop 15;

FIGURE 6 is a side view, partly broken away, taken in the direction of the arrow 6A of FIGURE 4;

FIGURE 7 is an enlarged cross-sectional view of the scribe 67 along the section indicated by plane 7A of FIGURE 6;

FIGURE 8 is a transverse cross-sectional view taken along plane 4A–4B at a position of the device 10 in the system where the device 10 is in the lowest portion of tubing 11; and FIGURE 9 illustrates a method of calibrating the recording instrument.

The system of this invention comprises a process and combination of apparatus for rapidly, accurately, reliably, and economically measuring and recording the sub-surface pressures and the level of fluids in a well. The combination of apparatus according to this invention is adapted to drop down the bore of a well, such as an oil well, within which there is liquid whose height it is desired to measure. The combination of apparatus comprises a first recording apparatus, 10, that records the change of momentum it undergoes on its initial contact with the top level of such liquid; such apparatus, in the preferred embodiment, contains means for accurately and reliably recording the pressure at such moment of initial contact. Such system also provides for such first apparatus to suffer a change of momentum at or near the bottom of such liquid: said apparatus is adapted to record such second change of momentum and the pressure at the moment of such second change of momentum. The combination of apparatus of this system also comprises a second automatic return driving apparatus 106 in combination with said first apparatus for reliably, rapidly, and economically bringing said first apparatus from the bottom to the surface of said well, whereat the record made by the first apparatus may be readily recovered and utilized for purpose of record, analysis, and measurement of the level of such liquid in such well.

The entire assembly of the record apparatus and the automatic return driving apparatus combination, according to this invention, are provided with a sufficiently small diameter relative to the internal diameter of the tubing through which they drop that such assembly will fall to and through the liquid in the well with sufficient velocity, not only to provide a clear indication of changes of momentum of the recording device 10 of this invention, but also to trip a mechanism of the second or automatic return apparatus which packs off or plugs the flow through and around the driving mechanism and causes it and the record device 10 to be forced to the surface with the well fluid, as described hereinbelow, when it is desired to return said recording device to the surface. The automatic return device of this invention in its preferred embodiment undergoes sufficient change in cross-sectional area to travel downward through the tube with a sufficiently substantial velocity adequate to trip such mechanism. The devices of this invention are, also, sufficiently sturdy to suffer such velocity and impact.

In operation the recording device, 10, of this invention, is placed into a string of oil well tubing, 11, in combination with a return apparatus 106 and drops through such string of tubing to and through the top of the liquid 12 therein, as at level 13 in zone 14, and to the bottom of the tubing or to a stop, as 15, near the bottom of such tubing: the recording device thereafter returns, as below described, to the surface 16, whereat the replaceable record disc 17 made by the recording device during its travel is readily and conveniently removed from said device for observation, measurement, and/or record. The interior sensing element of the device is actuated by pressure transmitted through perforations 18 from the producing zone 19 of the well 20.

A preferred embodiment of the depth measuring and recording device, 10, of this invention, is shown to scale and twice actual size in FIGURE 3; it is a long cylindrical apparatus which freely passes down the interior of a string of conventional oil well tubing, as 11, and, broadly, comprises a conventional pressure-sensitive Bourdon sub-assembly 21, a gear and table sub-assembly 22, and an inertia piston and scribe sub-assembly, 23, all cooperatively interconnected and positioned and located as below described in an external hollow steel cylindrical housing 24, ⅛" thick. Said housing has perforations 18 therethrough to permit the flow of external fluid as from the producing zone 19 of the well to the interior of said housing. Thereby the Bourdon tube 21 is sensitive to pressure outside housing 24, through transmittal of pressure by said fluid through the said perforations 18 in the housing adjacent said tube 21.

A vertically elongated cylindrical steel shaft, 25, having its central longitudinal axis coaxial with the central longitudinal axis of shell 24, is affixed to Bourdon tube 21 and is turned by said tube relative to said housing 24 to a degree dependent on the pressure of the fluid in which the Bourdon tube—and the device 10—are immersed.

On downward passage of the device 10 through tube 11 as above described, turns the Bourdon tube 21, being sensitive to pressure, turns the shaft 25 and its spline 27; a flat cylindrical housing plate, 28, is coaxial with shaft 25 and rotatably secured, as by pins 26A and and 26B, to a rotatable flat cylindrical base plate 29, coaxial therewith. A vertical shaft 30 is coaxial with shaft 25 and at its bottom is secured to and projects from said base plate 29 at its top, shaft 30 is keyed to and drives a scriber cam 31, which scriber cam is provided with an upper portion of spiral outline and vertical walls and a lower portion of larger spiral outline and a downwardly and outwardly sloped skirt surface 33.

Shaft 30 also drives a gear train composed of spur gears 34 and 35, axle 36, and spur gears 37 and 38. Spur gears 35 and 37 are affixed to shaft 36 which is coaxial to and affixed to the center of gears 35 and 37. Shaft 30 is coaxial with the center of the axes of gears 34 and 38; it rotatably and slidably contacts the center circular axial hole in gear 38 and is affixed to plate 29: plate 29, is in turn, affixed by longitudinally extending locking pins 26A and 26B to plate 129 which is, in turn, attached by pin 130 to gear 34. Gear wheel 38 is smaller in diameter than gear wheel 37, and gear wheel 35 is smaller in diameter than gear wheel 34. Accordingly, in the preferred embodiment, gear 38 revolves three times as fast as does scriber cam 31, which is attached directly to the shaft 30. Record plate 39 is fixed, as by screw 40, to high speed gear 38. Shafts 30 and 36 are firmly yet rotatably held and positioned parallel to each other in the locator plate 41. Fixed locator plate 41 is firmly held, as by screws, to the hollow, cylindrical steel internal housing shell 42. Gear 38 slidably fits and rotates about cylindrical shaft 30, which shaft 30 is located with the line of its longitudinal axial center passing through the center of rotation of said gears 34 and 38: said shaft 30 also serves to position such gears. The above described device is readily assembled as follows: the complete Bourdon assembly with shaft 25 firmly held thereto, as by bushing 43, said shaft, 25, being cylindrical in cross section and projecting from said bushing, is affixed to external housing 24 by lower screw threads 46; the internal shell or housing 42 is then firmly fixed, as by upper screw threads 47, to the Bourdon tube 21 while the pins, as 44 and 45, projecting from plate 29 lock said plate to the housing plate 28. This arrangement allows manipulation, repair and manufacture of the entire device as below described.

The inertia and scribe sub-assembly 23 comprises a floating piston assembly, 48, and a scribe assembly 49. The bulk of the weight of the floating piston is located in the solid steel head portion 50 of the piston 51. The piston fits in the cylindrical space within hollow tube 42 and is slidably positioned within shell 42 by laterally located longitudinally elongated diametrically spaced slots therein, 52 and 53, which slots are parallel to the longitudinal axis of shaft 30. Longitudinally elongated guides 54 and 55, respectively, slidably fit in these slots. The guides 54 and 55 project inwardly from the internal housing or shell 42 and firmly attach thereto.

In the preferred embodiment, the fit of the guides 54 and 55 in slots 52 and 53 is a plus or minus .001 inch fit. By the structure above described, piston 51 is longitudinally slidably supported within cylindrical shell 42 while prevented from rotating with respect to said shell. The top of piston 51 is provided with a laterally projecting annular shoulder 64 which contacts yoke 57, the element thereabove, and limits the upward motion of piston 51.

A yoke 57, with a vertically extending central cylindrical chamber 56 open at its top therein, is replaceably affixed to shell 42 as by screw thread 58. An inwardly projecting annular shoulder 62 is located at the bottom of yoke 57 and forms an integral part of said yoke. A cylindrical tongue 63 vertically projects upwards from, and is firmly attached to and integral with head portion 50 of piston 51 and also projects through the hole in the annular shoulder 62. A vertically extending helical steel spring 59 is supported and loosely fits in chamber 56 on the shoulder 62 and loosely surrounds tongue 63. A locknut 60 is adjustably attached to tongue 63 and, through a wide washer 74 compresses spring 59 against shoulder 62 and, as washer 74, fits slidably in chamber 56. Locknut 61 fixes nut 60 in position at a desired tension in spring 59. Accordingly, tongue 63 of piston 51 freely projects through the opening in the annular shoulder 62 and is forced upwardly by spring 59, which spring is held elastically in compression between shoulder 62 and nut 60.

In the preferred embodiment, the spring 59 is so adjusted and tightened by nuts 60 and 61 as to bear the complete weight of the piston 51 without pressing the top of shoulder 64 of piston 51 against the bottom of shoulder 62 with a force greater than one-third of the total weight of the piston and scribe assembly therebelow; thereby said piston and scribe sub-assembly 23 is readily responsive to inertia forces as below described.

Piston 51, through a vertical stud 65, supports a horizontally elongated J-shaped resilient steel support member 66. This support has a longer upper arm 68 attached to said stud and a shorter lower arm 78, the lower arm being vertically below the upper arm and parallel thereto. The material of which the support member is made is substantially greater in its width (shown in FIGURES 4 and 7) than in its thickness (shown in FIGURES 6 and 7). In the preferred embodiment the width is $\frac{1}{16}''$ and the thickness is $\frac{1}{64}''$ and a high grade spring steel is used. This stiffness resists relative horizontal movement of arms 68 and 78, which arms remain in the same vertical plane during any approximation of the ends 75 and 79 of said arms 68 and 78 respectively. A scribe point 67 is firmly affixed substantially at the end 79 of lower arm 78.

In the preferred embodiment, the scribe point 67 comprises a shaft 85, a point 86 and a shoulder 87. The shaft firmly fits into arm 78 and shoulder 87 is welded or soldered to the arm 78 whereby said scribe point is firmly located with respect to said arm and maintains a fixed orientation at right angles to the width of said arm 78. Disc 17 is, in the preferred embodiment, made of brass and has a black paint layer on its upper surface 81 which layer 81 is only sufficiently thick to completely cover said disc and so visually intensify a trace or scratch mark 72 made therethrough by the scribe point on said upper surface 81. The scribe point has a hardness of a steel file in the preferred embodiment and is sufficiently sharp to pierce and scrape through the thin layer of dull black paint on the top of disc 17. The member 66 is adjusted in tension and stiffness to provide a sufficiently firm contact between surface 81 and scribe point 67 to form a distinct scratch mark. The force between said surface and point is controllably adjusted to permit said point to evenly slide over said surface while forming said record. For this purpose the angle between the arms 68 and 78 may be observed and adjusted (as by a long nosed pliers) through a viewing and adjusting orifice 82 in housing 42. Orifice 82 may be closed by an orifice plate 83, attached as by screws to said housing. Set screw 89 and corresponding holes in yoke 57 and shell 42 serve to releasably fix the position of yoke 57 relative to housing 42; spring 59 draws shoulder 64 of piston 51 against shoulder 62 of said yoke and thus fixes the position of the lower surface 90 of piston 51. Fixed means as screws 91 and 92 fix locator plate 41 in housing 24 and shaft 30 definitely locates record plate 39 as by a spline and set screw. The above structure permits a ready removal of piston 51 and yoke 57 from shell 42 and, also, their ready and accurate replacement at their initial position relative to surface 81. Adjustment of scribe 67 also permits any final adjustment of force of scribe point 67 against surface 81; once set, no further adjustment is necessary on repeated use except for wear.

The upper arm 68 of support 66 pivots in a horizontal plane about the end 75 of arm 68 which is pivotally attached to the lower end of stud 65. A spiral spring, 70, resiliently expansible in a horizontal plane, is pivotally attached to the lower portion of said stud and also to the lower portion of piston 51 and urges the support 66 to rotate about stud 65 in the direction of the arrow 69 toward cam 31. A spacing bar 71, elongated horizontally in a direction extending from the center of shaft 30 radially outwards towards the exterior of cylindrical shell 42 is permanently attached to arm 68 and at right angle thereto. In cooperation with said spring 70, arm 71 positively keeps the scribe 67 at a pre-determined distance from the periphery of the scribe or cam 31. In the prefered embodiment, the overall length of element 66 is 3/8 inch and arm 71 is 1/8 inch long and meets arm 68 at the middle thereof. Scribe 67 is located, in the preferred embodiment, on arm 78 halfway of the horizontal distance between a vertical projection of the point at which arm 71 meets arm 68 and a vertical projection of the end of arm 68 distant from end 75. Thereby there is some magnification on chart or trace 72 of the distance between points 95 and 96 on surface 32 of cam 31. The length of arm 68 and the position of stud 65 are so related to the size and shape of scriber cam 31 that the path of the scribe point 67 will extend radially sufficiently to provide a spirally shaped trace, all portions of which are readily distinguishable from each other. For this purpose, in the preferred embodiment, the radial distance from the most central point 95 to the most peripheral point 96 in the upper surface 32 of the cam is slightly less than the radial distance from the most central point to the most peripheral point in the path as 72, generated by scribe 67 on surface 81. Stud 65 is located radially at a distance from the center of shaft 30, which is halfway between the central and the peripheral points on the trace formed by the scriber cam. The arm 71 has a length adequate to space arm 68 away from all portions of the cam 31 with which it or any other portion of support member 66 might otherwise collide at the position of cam 31 provided at upper portion of tubing 11 while also avoiding collision of the resilient arm 66 with shell 42 when device 10 is in the lower portion of tubing 11.

When the record device 10 is dropped into a capped well as 11, according to the process and system of this invention, the pressure on the record device is indicated and recorded by movement of the surface 81 of the record disc 17 relative to the scribe point 67: the scribe point is sharp and of substantially greater hardness than the paint layer and metal surface therebelow of the disc 17. In the preferred embodiment, the scribe point has a hardness slightly greater than a steel file.

Record disc 17 is supported on top of the record table 39 and is fixedly, yet replaceably, attached thereto; it receives the record curve, 72. The number of revolutions of the record 17 per each revolution of the Bourdon gauge 21 is set by the relations of the gear train 34-35-36-37-38-39 to the shaft 30, as above described.

Accordingly, the scribe point, 67, urged increasingly laterally by the slidable contact of arm 71 with the rotating spiral cam 31, traces a spiral path 72 of increasing diameter as the device 10 encounters greater external pressure, and the curve 72 thus traced is approximately and substantially an Archimedes spiral. The amount of rotation of the shaft 30 is an indication of the pressure at any instant to which the device 10 is subjected, as measured by the Bourdon assembly. In the preferred embodiment herein described, path 72 will provide up to three 360° spiral segments, inasmuch as the record 17 rotates three times as fast as the shaft 30 and three such segments will therefore be the maximum available for each full rotation of cam 31.

The pressure corresponding to each point on the record thus made on surface 81 may be read from a calibration curve or a table, as in Table 1. Such calibration table may be conveniently made by immersing the device in a bomb as 97, as in FIGURE 9, and applying hydraulic pressure thereto. Such bomb is provided with a source of pressure 98 and a valve controlled inlet, 99, therefor and a pressure indicator, 100. The arm 25A of such instrument is provided with a rotatable arm which rotates in a plane over a scale 110 to facilitate calibration of the instrument.

*Table 1*

[Correlation of pressure on subassembly 21 and degree of rotation measured along path 72]

| Degree of rotation along path 72: | Pressure (p.s.i.g.) |
|---|---|
| 0 | Atmospheric |
| 90 | 180 |
| 180 | 360 |
| 270 | 540 |
| 360 | 720 |
| 450 | 900 |
| 540 | 1080 |
| 630 | 1260 |
| 720 | 1440 |
| 810 | 1620 |
| 900 | 1800 |
| 990 | 1980 |
| 1080 | 2160 |

In the preferred embodiment of the invention for use in a well of about 5,000 feet depth where there may be a liquid level of 50 feet to 2,000 feet in height, a Bourdon tube assembly of such characteristics is chosen so that each 360° revolution of shaft 25 and each three revolutions of disc 17 correspond to a change of pressure of 2,520 lbs. per square inch. Such relation of pressure change to a rate of revolution is particularly useful for such range of work. The exact value of the pressure change per revolution or fraction thereof will be checked, as by the above-described bomb calibration, prior to use of the device.

With the cam 31 having an outline in the shape of an Archimedes spiral and arranged as above described with respect to the path of the scribe point 67 and the gear train 34-35-36-37-38 arranged to turn record plate 39 at an angular rate three times the angular rate of rotation of shaft 25, the curve 72 will be an Archimedes spiral. When used in a pressured well of 5,000 feet depth with 300 feet of fluid therein and with a bottom hole pressure of 2,000 p.s.i.g., there will be substantially three 360° segments, each sufficiently separated from each other to permit ready measurement therealong. FIGURE 5 shows a measurement of 1,080 lbs. per square inch pressure difference between the points indicated by spikes 76 and 77, and a total bottom pressure of 1440 p.s.i.g.

In operation of the device of this invention as above described and outlined, when the record device 10 falls through the tubing 11 of the capped well 20, on contact of the device with a liquid-gas interface, as 13, there is a change of momentum of assembly 21 and of the piston suspending shells 24 and 42 of device 10 as well as the device 106 attached thereto. The piston 51, being only resiliently suspended on the shell 42, will continue to drive downward relative to shell 42 on such change of momentum of shells 24 and 42 with a sufficient energy to overcome the restraining force of spring 59 until piston 51 is brought to rest by shoulders 101 and 102—at top of slots 52 and 53, respectively—against the top of guides 54 and 55, respectively. Arm 71 and support 66 attached thereto are then moved peripherally by the lower, outwardly sloped, portion 33 of the Archimedes shaped cam 31. This moves scribe 67 similarly outward. For this purpose the vertical height of the sloped portion of cam 31 is greater than the distance between said shoulders 101 and 102 and the top of the corresponding guides 54 and 55; the angle of the exterior surface of the lower sloped angular portions 33 of cam 31 is at 30° to the vertical in the preferred embodiment and at a similar angle to the exterior vertical surface of portion 32 of cam 31. The above described peripheral motion of scribe 67 is sharp and provides a spike, as 76, in the curve 72. After the above deceleration of the device 10 on meeting the fluid, piston 51 is resiliently returned by spring 59 to the position whereat its top is again adjacent shoulder 62, and the curve 72 is continued to be smoothly generated as the Bourbon tube continues its rotation to a degree proportional to the pressure applied thereto. When the downwardly moving device 10 reaches the bottom of the hole or a bottom stop in the well is reached, the momentum of piston 51 again overcomes the restraining force of spring 59 which served to position piston 51 with its shoulder 64 against the shoulder 62 of the yoke 57, and the lower cam portion 33 again moves arms 71, 68, 78, and the scribe point 67 outwardly to form a second spike, 77. The distance along path 72 between spikes 76 and 77 forms a measure and record of the depth of liquid in the hole, the absolute value of which depth is determined as follows.

The ratio of oil and water produced in any given oil well is known from the analysis of the production thereof. Accordingly, the specific gravity of the fluid in the well from the top of fluid level to the bottom thereof is accordingly known by the following formula:

$$s.g.m. = (\text{percent } W \times 1.0) + (\text{percent } O \times s.g.o.)$$

where:

s.g.m. = specific gravity of mixture
Percent $W$ = percent by weight of water in the oil-water mixture produced by the well
Percent $O$ = percent by weight of oil in the oil-water mixture produced by the well
s.g.o. = specific gravity of oil The change of pressure between points 76 and 77 along the path of curve 72 is determined by the following formula:

$$P = D \times p/d$$

Where:

$P$ = Change in pressure between points 76 and 77
$D$ = Distance between points 76 and 77, expressed in degrees
$p/d$ = Pressure change, expressed in pounds per square inch for each degree of rotation of shaft 25

The measured height of fluid in the well ($H$) is given by the following formula:

$$H = P/s.g.m. \text{ (Symbols as given above.)}$$

As the depth of the bottom stop from the bottom of the well is known from the completion data of the well, as well as that the depth of the bottom stop is itself known from the completion data of the well, the absolute sum of the height of the fluid in the well is the measured height of fluid ($H$, above) plus the distance from the well stop to the bottom of the well.

Release of the gas pressure above the liquid in the hole 20, as by release of valves 103 and 104, at the top of the well tubing 11 in the "Christmas tree" portion permits the pressure in the producing zone 20 to flow—the assembly comprising the record device 10 and the driving device 106 therefor, such as the automatically reciprocating piston above described in outline and described in detail in my co-pending application Serial No. 35,831, filed June 13, 1960, to the surface 16. There the assembly is removed from the tubing 11, after closure of valve 104, through the valve 107, outside tube 24 is unscrewed from threads 46, yoke 57 is unscrewed from threads 58, and the keeper-nut 105 is removed and a replaceable record disc 17 is removed from its place on the plate 39. Then, another fresh record disc is placed on plate 39, the keeper-nut is replaced, the yoke is replaced and adjusted as above described to provide proper relations of this scribe 67 to the surface 81 and shell 24 is replaced, whereby the record of the well measurement is recovered and the apparatus ready for another run.

In an exemplary form of the invention, the measuring device, 10, for use in a 2" internal diameter well tubing, 11, will comprise an external steel tube, 24, which is 5' long and has a 1¼" outside diameter. The driving apparatus 106 will be 20" long and have a 1¹¹⁄₁₆" outside diameter. The preferred driving device, is described in detail in my co-pending application 35,831, and comprises a hollow tube having a substantial wall thickness and a central longitudinal axis and chamber therein, a series of continuous similar wedging elements within the tube, such series of wedging elements being held in either of two positions, said series of continuous elements being movable by an elongated rod at either end thereof, each of which elongated rods protrudes from an end of the tube, and pistons located in part within said tube and normal to the longitudinal axis of said hollow tube, said pistons being expansible along their length, and contacting the wedging elements, the length of said pistons being determined by the position of said wedging elements relative to said pistons, said hollow tubes having orifices therein permitting each of the pistons to expand from said tube in direction normal to the axis of hollow tubes and a plurality of ring segments movably attached at their ends to said pistons and movable radially with the end of said pistons, said ring segments, in cooperation with said pistons, circumscribing said hollow tube, the outside wall of said hollow tube having recesses therein which receive entirely said ring segments whereby the cross-sectional area of said piston and ring segments with pistons in expanded form is substantially—e.g., 20% to 50% greater—than the maximum diametral cross-section of said hollow tube alone.

In the preferred embodiment, disc 17 is marked off in degrees, as 0°–90°–180°–270° as shown in FIGURE 5 so that the number of degrees between spikes 76 and 77 is readily measured. It is also within the scope of the invention that such disc be marked off directly, either in pressures expressed in pounds per square inch or in height in feet of water—in such latter instance a correction factor of specific gravity alone need be applied to the reading to determine the height of fluid. The Bourdon gauge is accurate to within plus or minus ½% (i.e. ±10 p.s.i.) in 2000 lbs. pressure and, accordingly, the accuracy of the instrument is not a limiting factor.

While the above description has been given for the measurement of one liquid of a constant specific gravity in a well and for the procedure of measurement of such single fluid in a well, it will also be apparent that the change of momentum from entering one phase, such as an oil phase, to another phase, such as a water phase, where there is a clean cut distinction between such phases may provide a record of change of momentum, and thereby the depth of the water phase and the depth of the oil phase separately and so provide a record of the separate height of each phase as well as the total height of both phases.

The process of this invention, also, may be accomplished by having a first man, at one time, drop an expansible piston as 106 down the tubing 11 towards the bottom of the well 20 to be measured; subsequently, a second man comes by with the well record measurement device 10 and drops that down the well tubing 11 and liquid 12 therein, as above described; subsequently a third man opens up valves 104 and 107 of the well, flows the well, and recovers the instruments 10 and 106 and the record 17 as above described, thereby minimizing the amount of working time spent in obtaining such record. Where feasible this procedure is preferred to that of having one man wait while the instruments pass down the well and until they are retrieved as above described.

This use of two or three men to accomplish the process of this invention more than doubles the capacity per man of measurement. For example, in the conventional liquid determinations in a well using a wire line, obtaining 8 to 10 well liquid measurements for wells of about 6,000 feet is a good 8-hour day's work, whereas, with the device and procedure of this invention 20 to 25 such measurements are done with no trouble at all with one man in 8 hours. When the two and three men system above described is used, even greater productivity per man is obtained.

Any well with a permanent installation of a collar stop or other device to permit the tripping of such an expansible piston as 106 at or near the bottom of the tubing could also be used. Accordingly, the procedure as above described may be used not only in flowing wells but also this invention covers the use of the combination of the expansible piston as 106 and the record device 10 in a plunger lift installation. In such installation the expansible piston would be tripped at or near the top of the plunger pump and thereby take its expanded disposition and structure, the measuring and record device 10 is then dropped down tubing 11 through liquid therein, as 12 and makes a record of the depth of liquid as above described: subsequently, after the recording device had come to rest on top of the expansible piston, the plunger pump pumps the expanded piston up the well tubing 11 while the recording device 10 is supported on top of said expanded piston. In this procedure involving a plunger lift installation, the expansible piston as 106 is used substantially only for the recovery of the well measurement device.

The transfer of the record obtained according to this invention to the office record can also be done three to four times as fast as by the wire line record method. One needs to make a microscope reading on the conventional record whereas this invention provides as above described for a direct reading from the record 17. With 10 or 12 stops on a wire line record of a 6,000 foot well, it takes 10 minutes to set up the record for reading and 25 to 30 minutes to transfer the reading from such record to a chart, whereas with the record made according to this invention such a transfer is easily accomplished in 5 minutes. Completion of fifteen to twenty charts of 10 to 12 stops for a 6,000 foot well in an 8-hour day is a good 8-hour day's work on the charting of wire line records while, with the record made by the apparatus of this invention, 15 to 20 charts of such a 6,000 foot well are accomplished in two hours.

According to this invention, therefore, there is provided a process for obtaining a record of the depth of a liquid in a well which comprises the steps of measuring the density of liquid from the well, concurrently recording the pressure on and changes of momentum of a device falling to and through said liquid in said well to a position a fixed distance from the bottom of said well, returning said device to the top of said well by providing for said first device an externally expansible piston, which piston on moving to the bottom of said well automatically expands its peripheral surface to provide such an increased cross-sectional surface thereof as to slidably yet firmly fit said oil well tubing and provide a movable seal therein for the fluids in the well, passing said expansible piston and recording device to the top of said well, recovering said record from said device and converting the pressure reading on said record between said record of changes of momentum, in view of the density of said liquid, to a measure of the height of such liquid in said well.

Also according to this invention, a piston or plug which has a 1⅞" O.D. and loosely fits into the well tubing as 11 above described may be used in combination with the record device 10 in place of the expansible piston 106 in the procedures and combinations of apparatus as above described. In such procedures the piston is, preferably, dropped down the well separately from and sufficiently prior to the dropping of the record device 10, in order to not interfere with the record of changes of momentum desired to be measured by the record device 10. In such procedures such piston preferably reaches the bottom of the well prior to dropping the record device 10 from the surface level thereof. Such a loosely fitting plug or piston does not require to be tripped to provide an expanded cross-section in order to be subsequently "flowed up" or moved up from the bottom to the top of the well by action of fluid therebelow. Such a loosely fitting plunger or piston fits sufficiently loosely to reach the bottom of the well in an economically short time. However such a loosely fitting piston or plunger or piston has a sufficiently close fit to be reliably and rapidly forced up the well in combination with the record device 10 thereabove by action of a plunger lift on the fluid or gas (or both) in the well in the case of a well with a plunger lift installation.

While the above-described procedure of separately dropping the loosely fitting piston and the record device is preferable in the interest of reducing the worker's time spent in waiting for the record and piston to travel down and up the well, it is also within the scope of this invention that the loosely fitting piston and record device travel attached together down the well and through the fluid therein as well as return together.

When used in combination with the record device 10, the top of the expansible piston or the loosely fitting plunger above described as driving device 106 is, in the preferred embodiment, firmly attached to the bottom of device 10 in order to avoid chattering therebetween and interference with the record of changes of momentum made by the scribe 67 on record 17, as at the liquid-gas interface level 13 during the travel of device 10 from the surface to the bottom and then to the surface of the well in which used as above described.

Although, in accordance with the provisions of the patent statutes this invention has been described as embodied in concrete form and the principle of the invention has been described with the best modes in which it is now contemplated applying such principle, it will be understood that the constructions shown and described are merely illustrative and that the invention is not limited thereto since alterations and modifications will readily suggest themselves to persons skilled in the art without departing from the true spirit of the invention or from the scope of the annexed claims.

I claim:

1. A depth measuring and recording device comprising a perforated shell, within which, cooperatively interconnected, are a pressure sensitive means, a rotatable record table sub-assembly, and an inertia and scribe sub-assembly, said pressure sensitive means being within and firmly attached to said shell, an indicating element of such pressure responsive means being rotatable and rotating with respect to said shell on the application of pressure to said pressure sensitive means, said rotatable record table sub-assembly comprising a turntable attached to and driven by said pressure sensitive means and rotatable with respect to said shell in a plane normal to the length of said shell, a replaceable record surface supported on said turntable, whereby a record of pressure encountered by said pressure sensitive means is made on said record surface, said inertial and scribe assembly comprising inertia means slidably supported on said shell and resiliently urged upwards in said shell and movable along the longitudinal axis of said shell on longitudinal change of momentum of said shell, a cam between said inertia means and said turntable, said cam having an upper portion on which the exterior surface is parallel to the axis of said shell, and a lower portion on which the exterior surface is at an angle to said exterior surface of said upper cam portion, said upper and lower portions' exterior surfaces joining and forming an outwardly directed obtuse angle, and a scribe support attached to said inertia means, a scribe point on said scribe support, said scribe support slidably supporting said scribe in contact with said turntable surface, and said scribe support contacting said lower portion of said cam on longitudinal change of momentum of said shell, whereby said point moves radially relative to said record surface on lengthwise change of momentum of said device.

2. A depth measuring and recording device comprising a perforate shell within which are, cooperatively interconnected, a pressure sensitive means, a rotatable gear train and a record table sub-assembly, and an inertia and scribe sub-assembly, said shell being cylindrical, elongated, and hollow, and its walls perforated adjacent the pressure sensitive element, said pressure sensitive means being firmly yet releasably attached to and within said shell, an indicating element of such pressure sensitive means being rotatable coaxially with said shell and rotating with respect to said shell on the application of pressure to said pressure sensitive means, said gear train being attached to and driven by said rotating element of said pressure sensitive means, said rotatable table sub-assembly comprising a turntable attached to and driven by said gear train and rotatable with respect to said shell in a plane normal to the length of said shell, said gear train revolves said turntable at a greater rate of rotation than that of said indicating element, and a replaceable record surface supported on said turntable, whereby an elongated record of pressure encountered by said pressure sensitive means is made on said record surface, said inertia and scribe means comprising a weight slidably supported on said shell and movable only along the longitudinal axis of said shell, an inwardly projecting shoulder attached to said shell, elastic weight support means resiliently urging said weight upwards against said shoulder while permitting downward movement of said weight on downward deceleration of said shell, an eccentric cam between said weight and said turntable and driven by said indicating element at the same rate of rotation as said element, said cam having an upper portion the exterior surface of which is parallel to the axis of said shell and a lower portion the exterior surface of which flares outwardly at an angle to said upper surface, said exterior surfaces of said upper and lower portions joining and forming an obtuse angle, and a scribe support means attached to said weight, said support being pivotally supported on said weight for rotation in a plane parallel to the plane of said record surface, a scribe point on said scribe support, said scribe support slidably supporting said scribe in recording contact with said turntable surface, spring means resiliently urging said scribe support and scribe point to rotate towards said cam, said scribe support contacting the upper portion of said cam when said weight is urged upwards against the said shoulder and resiliently contacting said lower portion of said cam surface on downward deceleration of said shell, whereupon an outwardly directed trace is formed on said record surface on lengthwise change of momentum of said device.

3. An apparatus as in claim 2 wherein said shell houses, supports, and aligns the pressure sensitive element, the gear train, and turntable, and the inertia and scribe sub-assembly is releasably and removably affixed to and supported on said shell.

4. An apparatus as in claim 3 wherein means releasably attached to said housing define and fix a location for said weight support means relative to said record surface and said shoulders attached to said shell limit the movement of said inertia and scribe sub-assembly with respect to said shell.

5. An apparatus as in claim 2 also including an orifice through said shell in the neighborhood of said scribe support to permit adjustment of said scribe support from the outside of said shell.

6. An oil well depth measuring and recording device comprising, co-operatively inter-connected, a pressure sensitive means, a rotatable record sub-assembly, an inertia and scribe sub-assembly, and support means for said assemblies, said pressure sensitive means being firmly attached to said support means, an indicating element on such pressure responsive means, said element being movable with respect to said support means on the application of pressure to said pressure sensitive means, said rotatable record sub-assembly comprising a turntable attached to and driven by said pressure sensitive means and rotatable with respect to said support means beyond one complete revolution of 360°, and a record surface on said turntable, whereby a spiral record of pressure encountered by said pressure sensitive means is continuously made on said record surface and extends beyond a complete revolution of 360°, said inertia and scribe assembly comprising inertia means slidably supported on said support means and movable along the longitudinal axis of said support means on a longituudinal change of momentum of said device, a scribe support attached to said inertia means, a scribe point on said scribe support, said scribe support slidably supporting said scribe in continuous recording contact with said record surface, and means attached to said support means moving said scribe radially to and on said record surface while in continuous contact therewith on lengthwise change of momentum of said device in an amount proportional to the amount of said change of momentum.

References Cited by the Examiner

UNITED STATES PATENTS

| 1,946,576 | 2/34 | Dunne et al. | 73—300 |
|---|---|---|---|
| 2,592,159 | 4/52 | Klebba et al. | 73—300 |

FOREIGN PATENTS 259,866  10/26  Great Britain.

RICHARD C. QUEISSER, *Primary Examiner.*